Sept. 12, 1967   J. P. LOMBARDI   3,340,901
SPIRAL SEAMED CORRUGATED LAMINATED
PIPE WITH UNCORRUGATED INTERIOR
Filed April 6, 1965   2 Sheets-Sheet 1
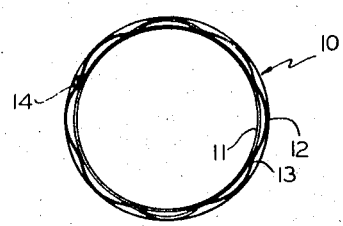
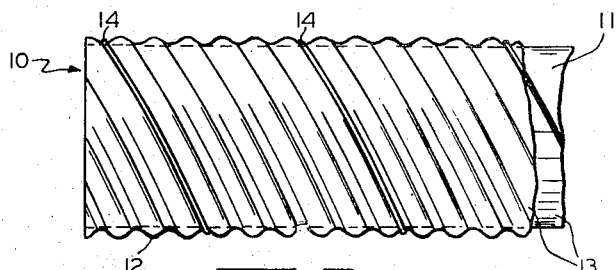
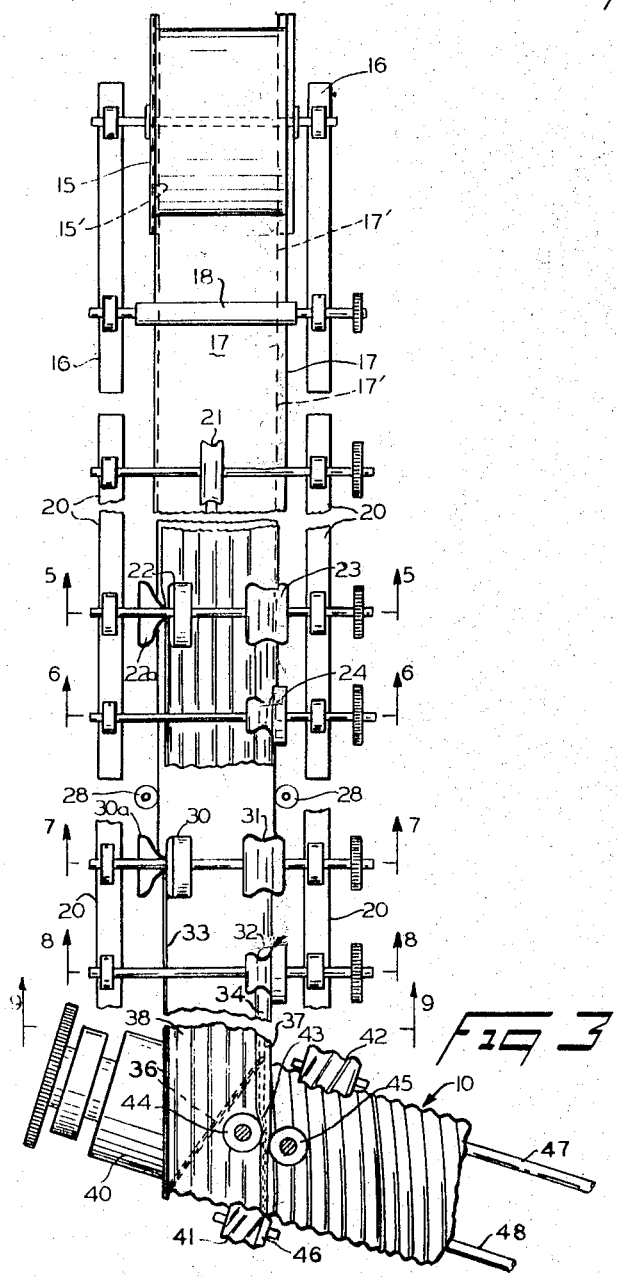
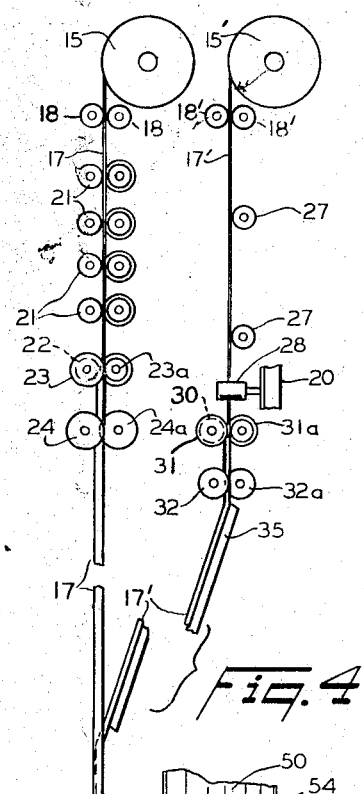
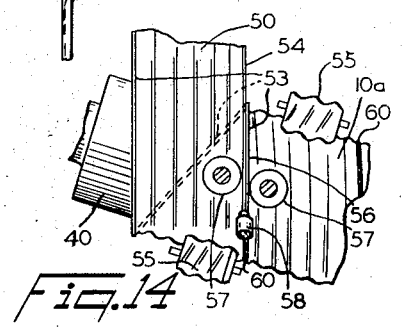
INVENTOR.
JACK P. LOMBARDI
BY Bruns and Jenney
Attys

United States Patent Office 3,340,901
Patented Sept. 12, 1967

3,340,901
SPIRAL SEAMED CORRUGATED LAMINATED
PIPE WITH UNCORRUGATED INTERIOR
Jack P. Lombardi, Duguid Road,
Manlius, N.Y. 13104
Filed Apr. 6, 1965, Ser. No. 445,966
3 Claims. (Cl. 138—173)

ABSTRACT OF THE DISCLOSURE

A laminated pipe having a plurality of layers including a smooth uncorrugated inner layer and a corrugated outer layer. A laminated web including inner and outer layers is helically wound and the successive turns of the web are secured to one another by a single helically extending seam which also secures inner layer to outer layer. The corrugated outer layer has a plurality of hills and valleys between successive turns of the seam, the valleys extending around and supporting the inner layer, the clinched or welded seam lying in a valley.

This invention relates to a spiral seamed laminated pipe with corrugated outer layer and uncorrugated inner layer.

Corrugated pipe is widely used for culverts and other drainage pipe because of its strength. Because of its corrugations, however, water does not drain entirely from the pipe, resulting in corrosion of the pipe.

The principal object of the invention, accordingly, is to provide a corrugated pipe having an uncorrugated inner wall so that drainage through the inside may be complete.

A further object is to provide a spirally wound laminated pipe with corrugated exterior and uncorrugated interior in which the interior lamination extends continuously around the interior of the pipe and the outer corrugated layer completely encloses the interior layer.

Other objects and advantages will appear from the following description in conjunction with the appended drawings, in which:

FIGURE 1 is an end view and FIGURE 2 is a fragmentary side elevational view of a section of pipe according to the invention;

FIGURE 3 is a diagrammatic fragmentary plan view of apparatus for the fabrication thereof;

FIGURE 4 is a diagrammatic fragmentary side elevational view of a portion of the apparatus of FIGURE 3;

Figure 5:
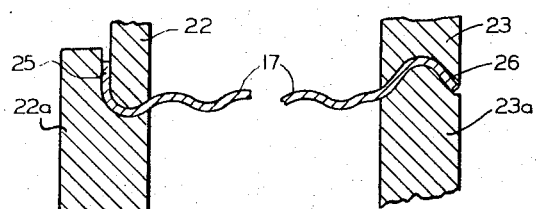
Figure 6:
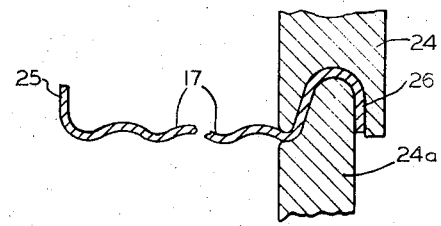
Figure 7:
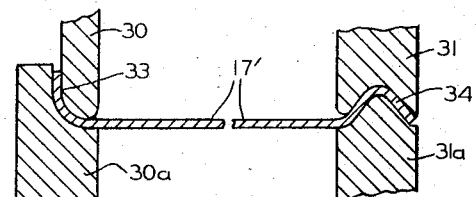
Figure 8:
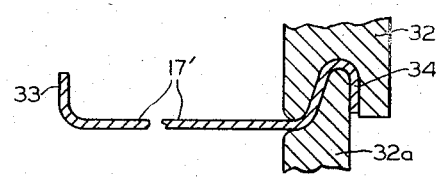
Figure 15:
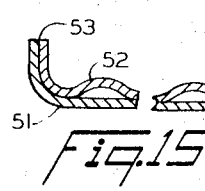
Figure 9:
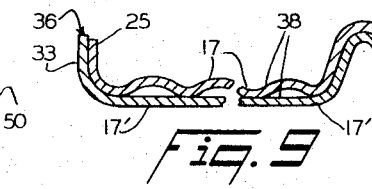
Figure 16:
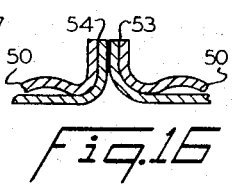
Figure 10:
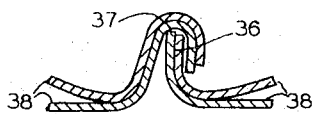

FIGURES 5 and 6 are enlarged diagrammatic fragmentary sectional views of the upper layer of the web on the lines 5—5 and 6—6, respectively, of FIGURE 3;

FIGURES 7 and 8 are enlarged diagrammatic fragmentary sectional views of the lower layer of the web on the lines 7—7 and 8—8, respectively, of FIGURE 3;

FIGURE 9 is an enlarged diagrammatic fragmentary sectional view of the web on the line 9—9 of FIGURE 3;

FIGURES 10, 11, 12 and 13 are enlarged diagrammatic fragmentary sectional views illustrating successive steps in forming the locking seam on the mandrel;

FIGURE 14 is a fragmentary plan view of the mandrel showing welding means for forming the spiral seam;

FIGURE 15 is a sectional view similar to FIGURE 9 showing a laminated web for use with the welded seam; and FIGURE 16 is a sectional view similar to FIGURE 10 showing the locking flanges of adjacent turns on the mandrel prior to welding the seam.

In FIGURES 1 and 2 are shown a laminated corrugated pipe 10 having an inner uncorrugated layer 11 and an outer corrugated layer 12. The pipe 10 is spirally wound, both inner and outer layers of the laminated sidewall 13 being joined, as will hereinafter appear, along a spirally extending seam 14, one edge of each turn of the laminated sidewall web being locked to the web of the adjacent turn by the seam 14.

In FIGURES 3 and 4, apparatus is diagrammatically shown illustrating the method of fabrication of the pipe 10.

Two reels 15 and 15' are supported, one above the other, on suitable shafts journalled on the frame 16. Elongated strips 17 and 17' of sheet metal are drawn from the reels over suitable aligning rolls 18 and 18' and fed to forming rolls journalled on a mill frame 20 (FIG. 1) aligned with the reel frame 16.

A series of corrugating rolls 21 are provided on frame 20 for the strip 17 and beyond the corrugating rolls, edge forming rolls 22 and 22a, 23 and 23a, and 24 and 24a are provided for forming locking flanges on the edges of the now corrugated strip 17. As best seen in FIGURES 5 and 6, the forming rolls 22 and 22a provide the strip 17 with an upturned male locking flange 25 one edge of the strip in a manner more fully described in my copending application Ser. No. 351,352, filed Mar. 12, 1964, now Patent 3,263,321 issued Aug. 2, 1966. Edge forming rolls 23, 23a, 24 and 24a form a downwardly facing female locking flange 26 at the other edge of the strip 17 in a two-step operation.

As best seen in FIGURE 1, strip 17' below strip 17 is somewhat narrower to allow for the narrowing effect of the corrugating operation on strip 17 and, as seen in FIGURE 4, support rolls 27 journalled on frame 20 are provided for carrying strip 17' under the corrugating mill for strip 17.

Alignment rollers 28 are provided for the strip 17' for precisely aligning the strip with respect to upper strip before it enters the edge forming rolls 30, 30a, 31, 31a, 32 and 32a which are supported on frame 20 for the lower strip. As best seen in FIGURES 7 and 8, the rolls 30 and 30a form an upwardly projecting male locking flange 33 on the edge of strip 17' underneath the flange 25 of the upper strip and rolls 31, 31a, 32 and 32a provide a downwardly facing female locking strip 34 at the opposite edge of the strip in a two-step operation.

After passing through the edge forming rolls the lower strip 17' is guided upward toward the strip 17 by a chute 35 as indicated in FIGURE 4. As indicated in FIGURE 9, when the formed strip 17' meets the corrugated strip 17, the female flange 34 engages in the flange 26 of the upper strip to form a laminated female flange 37. The strip widths are so predetermined and the edge forming rolls so located that when the female flanges interlock, the male flanges 33 and 25 interengage at the other edge to form a laminated male locking flange 36 and the engaged strips 17 and 17' form a laminated web 38 whose upper layer is corrugated and lower layer is not.

Just as described in my copending application hereinabove referred to, the laminated web 38 is then wound over a rotating mandrel 40 which is disposed at an angle to the path of travel of the web 38. As the web 38 makes one complete turn about mandrel 40, the flange 36 which projects outwardly of the mandrel enters the inwardly facing female flange 37 of the succeeding turn of the web continuously, as the web is turned on the mandrel in a manner illustrated diagrammatically in FIGURE 10.

Rollers 41 and 42 are supported, by means not shown, around the mandrel 40 and have a conformation matching that of the corrugated outer layer 17 of the web. Rollers 41 and 42, and another not seen in FIG. 3, are driven, by means not shown, so as to act like gears to drive the formed pipe 10 auxially of mandrel 40 as it is formed.

Figure 11:
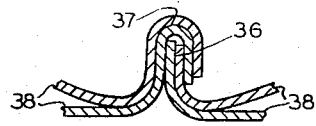

Web 38, as it is continuously drawn on to the mandrel 40, therefore has, at 43, a point where flange 36 of one turn is continuously entering the inwardly facing flange 37 of the next turn, and immediately beyond this point a pair of rollers 44, 45, also supported, by means not shown, adjacent mandrel 40, pinch the sides of flange 37 together against the interengaged flange 36, as shown diagrammatically in FIGURE 11.

Figure 12:
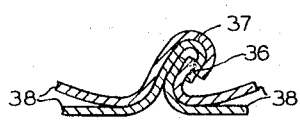
Figure 13:
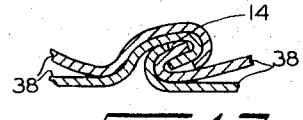

Roller 41 is provided with a tapered end 46 which knocks the now locked-together flanges 36 and 37 over toward one side as illustrated in FIGURE 12, and another roller such as roller 42 forces the locked-together flanges down against the web 38 to form the now double-locked seam 14.

The now formed pipe 10 is supported on axially extending rollers 47, 48 as it comes off the mandrel 40 and may be cut into any desired length by appropriate means such as a torch.

It will now be apparent that the corrugated outer layer 17 and the uncorrugated layer 17' are locked together at the lock seam joint 14 and each turn of the side wall web is locked to the adjacent turn forming a unitary and rigid pipe. While inner and outer layers are in contact only at the valleys of the corrugations, as shown in FIGURE 9, and at the seam 14, the pipe side wall is in two layers. The outer corrugated layer extends completely around the outside of the pipe, including the seam 14, and the uncorrugated inner layer likewise extends completely around the inside of the pipe. When installed in a culvert, for example, no pockets are formed by corrugations within the pipe and draining may be complete.

It will also be apparent that either the outer corrugated layer or the inner layer may be formed as a double layer, by means described in my aforesaid copending appliaction thereby providing a pipe with a third intermediate layer of sheet material, or the intermediate layer may be of material other than metal such as tar-paper. Alternatively, suitable plastic material may be applied between the inner and outer layer as the strip 17 rises on chute 35 to fill the spaces between layers formed by the hills of the corrugations in the outer layer.

Similar apparatus and method may be used to form a pipe 10a with a spiral welded seam as illustrated in FIGURE 14. Since welding the seam eliminates the necessity for interlocking hooks, male locking flanges are provided at either side of the web.

Referring again to FIGURES 3 and 4, the edge forming rolls 23, 23a, 24 and 24a are replaced with a pair of male flange forming rolls similar to the rolls 22 and 22a for the upper strip 17. Rolls 31, 31a, 32 and 32a are replaced by a single pair of rolls similar to rolls 30 and 30a for the strip 17'.

When the chute 35 guides the lower strip itno engagement with the upper strip a laminated web 50 is formed as shown in FIGURE 15 having an uncorrugated lower layer 51 and a corrugated upper layer 52. At either side of the web the male flanges project upward interlocking the web as shown and forming laminated flanges 53 and 54.

When the web 50 is wound around the mandrel 40, as shown in FIGURE 14, the laminated flanges 53 and 54 project radially of the mandrel. A plurality of rollers 55 guide the web 50 and force it against the mandrel. Rollers 55 are supported, by means not shown, independent of the mandrel, are corrugated to mesh with the outer layer of web 50, and are driven to force the pipe 10a axially of the mandrel as described above in connection with the fabrication of the pipe 10.

The angle at which mandrel 40 is disposed to the line of travel of web 50, as it comes from the forming mill, is such that the laminated flange 53, as web 50 is wrapped around the mandrel, comes up against the flange 54 of the succeeding turn of the web around the mandrel at a point denoted 56 in FIGURE 14. The laminated flange 54 of one turn abuts the laminated flange 53 of the preceding turn of the web in side-by-side manner as shown in FIGURE 16.

A pair of pinch rolls 57—57 force the abutting flanges 54 and 53 together immediately beyond the point 56 and an electrode 58, shown fragmentarily in FIGURE 14 is directed toward the pressed-together flanges 54 and 53 as they emerge from between rolls 57—57. Both the pair of rolls 57—57 and the electrode 58 are supported independently of the mandrel 40 and the electrode 58 may be a portion of an electron beam welding unit, or a shielded arc method of welding may be used.

After the welded flange 54–53 is beaded together by the welding means it is carried around the mandrel 40 and cools becoming the welded spiral seam 60 of the pipe 10a.

The welded pipe is continuously forced axially of the mandrel as described above and after it has left the mandrel the pipe is cut into suitable lengths.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A laminated pipe comprising a helically wound web formed throughout of a plurality of layers of formable sheet material, including an inner layer extending continuously in a plurality of helical turns to form the interior surface of the pipe, the inner layer having smooth, uncorrugated inner and outer surfaces between its side edges; and a corrugated outer layer extending in a plurality of helical turns around the inner layer to form the exterior surface of the pipe, the outer layer having alternating hills and valleys extending helically of the pipe; each turn of the inner and outer layers being secured together along their edges in a single helically extending seam, said seam securing one edge of each turn of web to the opposite edge of the adjacent turn of web, the junction of successive turns of the inner layer in the seam extending along a valley of the outer layer, a plurality of valleys of the outer layer supporting the inner layer around the pipe between successive turns of the seam, whereby the joined smooth inner layer turns extend continuously circularly and longitudinally of the pipe and are supported and strengthened by the outer layer turns.

2. A laminated pipe comprising a helically wound web formed throughout of a plurality of layers of formable sheet material including an uncorrugated inner layer extending continuously in a plurality of helical turns to form the interior surface of the pipe, and a corrugated outer layer extending in a plurality of helical turns around the inner layer to form the exterior surface of the pipe, the inner and outer layers each having a hooked flange at either side interengaged to form laminated hooks at each side of web, the inner layer having smooth inner and outer surfaces between the hooks, and the outer layer having alternating hills and valleys between the hooks extending helically of the pipe, each turn of the inner and outer layers being secured together by the hooks interengaged along their edges in a single helically extending lock seam, said lock seam being formed by the hook on one edge of each turn of web being engaged with the hook on the opposite edge of the adjacent turn of web and securing the successive turns of web together, the junction of successive turns of the inner layer at the seam extending along a valley of the outer layer, a plurality of valleys of the outer layer supporting the inner layer around the pipe between successive turns of the seam, whereby the joined inner layer turns extend continuously circularly and longitudinally of the pipe and are supported and strengthened by the outer layer turns.

3. A laminated pipe comprising a helically wound web formed throughout of a plurality of layers of formable sheet material, including an inner layer extending continuously in a plurality of helical turns to form the interior surface of the pipe, and a corrugated outer layer extending in a plurality of helical turns around the inner layer to form the exterior surface of the pipe, the inner and outer layers each having a flange at either side, the flange of one layer being engaged with the flange of the other, the inner layer having smooth inner and outer surfaces between the flanges, the outer layer having alternating hills and valleys between the flanges extending helically of the pipe, each turn of the inner and outer layers being secured together at their flanges in a single helically extending welded seam, the seam also securing the engaged flanges on one edge of each turn of web to the engaged flanges on the opposite edge of the adjacent turn of web, the junction of successive turns of the inner layer at the seam extending along a valley of the outer layer, a plurality of valleys of the outer layer supporting the inner layer around the pipe between successive turns of the seam, whereby the joined inner layer turns extend continuously circularly and longitudinally of the pipe and are supported and strengthened by the outer layer turns.

References Cited

UNITED STATES PATENTS

| | | | |
|---|---|---|---|
| 1,453,220 | 4/1923 | Witzenmann | 138—150 X |
| 1,648,148 | 11/1927 | Quinn | 138—173 |
| 2,444,008 | 6/1948 | Fentress | 138—122 |
| 2,874,722 | 2/1959 | Hamblin | 138—134 |
| 2,890,723 | 6/1959 | Evert | 138—122 |

FOREIGN PATENTS

| | | |
|---|---|---|
| 349,051 | 2/1922 | Germany. |
| 554,977 | 1/1957 | Italy. |

LAVERNE D. GEIGER, *Primary Examiner.*

C. L. HOUCK, *Assistant Examiner.*